United States Patent
Roychoudhury et al.

(10) Patent No.: US 9,789,794 B1
(45) Date of Patent: Oct. 17, 2017

(54) ACTIVE HEAD RESTRAINT

(71) Applicant: FORD GLOBAL TECHNOLOGIES, LLC, Dearborn, MI (US)

(72) Inventors: Raj S. Roychoudhury, Bloomfield Hills, MI (US); Michael Medoro, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/213,436

(22) Filed: Jul. 19, 2016

(51) Int. Cl.
*B60N 2/42* (2006.01)
*B60N 2/427* (2006.01)
*B60R 21/055* (2006.01)
*B60N 2/48* (2006.01)

(52) U.S. Cl.
CPC ....... *B60N 2/42727* (2013.01); *B60N 2/4228* (2013.01); *B60N 2/42781* (2013.01); *B60N 2/487* (2013.01); *B60N 2/4808* (2013.01); *B60N 2/4855* (2013.01); *B60N 2/4864* (2013.01); *B60N 2/4882* (2013.01)

(58) Field of Classification Search
CPC .............. B60N 2/42781; B60N 2/4882; B60N 2/4808; B60N 2/4855; B60N 2/42727; B60N 2/4228; B60N 2/4864; B60N 2/487
USPC .................................................... 297/216.12
See application file for complete search history.

(56) References Cited

U.S. PATENT DOCUMENTS

| | | | | |
|---|---|---|---|---|
| 6,550,856 B1 * | 4/2003 | Ganser | ..................... | B60N 2/20 297/216.12 |
| 6,688,697 B2 * | 2/2004 | Baumann | ............. | B60N 2/4864 297/216.12 |
| 6,715,829 B2 * | 4/2004 | Svantesson | .......... | B60N 2/4864 297/216.12 |
| 6,824,212 B2 * | 11/2004 | Malsch | ................ | B60N 2/4228 297/216.12 |
| 6,871,913 B2 * | 3/2005 | Malsch | ................ | B60N 2/4885 297/216.12 |
| 7,070,235 B2 | 7/2006 | Schilling et al. | | |
| 7,195,313 B2 | 3/2007 | Hippel et al. | | |
| 7,284,793 B2 * | 10/2007 | Kluhspies | ............ | B60N 2/4885 297/216.12 |
| 7,344,191 B2 * | 3/2008 | Schilling | ............. | B60N 2/4885 297/216.12 |
| 7,350,859 B2 * | 4/2008 | Klukowski | .......... | B60N 2/4885 297/216.12 |

(Continued)

*Primary Examiner* — Rodney B White
(74) *Attorney, Agent, or Firm* — Vichit Chea; Price Heneveld LLP

(57) ABSTRACT

An active head restraint for a seating assembly of a motor vehicle comprises a structural support for a seatback of the seating assembly, a movable head restraint pad having a stowed position and a deployed position, and a linkage deployment mechanism. The linkage deployment mechanism comprises an upper and lower bar pivotally attached at a forward end to a rear surface of the movable head restraint pad and pivotally attached at a rearward end to an outer tube fixed to an upper portion of the structural support. An inner tube reciprocates within the outer tube. A trigger mechanism is operatively connected with a lower end of the inner tube and urges the inner linkage and an actuating link to a raised deployed position in response to a rear impact event. The actuating link applies an upward force to the lower bar to deploy the movable head restraint pad.

20 Claims, 12 Drawing Sheets

(56) References Cited

U.S. PATENT DOCUMENTS

| | | | |
|---|---|---|---|
| 7,393,052 B2 * | 7/2008 | Humer | B60N 2/4228 |
| | | | 297/216.12 |
| 7,455,357 B2 | 11/2008 | Humer et al. | |
| 7,618,091 B2 | 11/2009 | Akaike et al. | |
| 7,992,933 B2 | 8/2011 | Yetukuri et al. | |
| 8,075,051 B2 * | 12/2011 | Vitali | B60N 2/4808 |
| | | | 297/216.12 |
| 8,109,567 B2 | 2/2012 | Alexander et al. | |
| 8,172,319 B2 | 5/2012 | Park et al. | |
| 8,205,941 B2 | 6/2012 | McFalls et al. | |
| 8,371,648 B2 | 2/2013 | Lee et al. | |
| 8,408,645 B2 | 4/2013 | Alexander et al. | |
| 8,616,633 B2 * | 12/2013 | Truckenbrodt | B60N 2/4864 |
| | | | 297/216.12 |
| 8,632,125 B2 * | 1/2014 | Yamaguchi | B60N 2/002 |
| | | | 297/216.12 |
| 2005/0127726 A1 * | 6/2005 | Schilling | B60N 2/4861 |
| | | | 297/216.12 |
| 2006/0071517 A1 * | 4/2006 | Humer | B60N 2/4885 |
| | | | 297/216.12 |
| 2007/0152482 A1 | 7/2007 | Schilling et al. | |
| 2007/0241593 A1 * | 10/2007 | Woerner | B60N 2/4864 |
| | | | 297/216.12 |
| 2008/0079294 A1 * | 4/2008 | Humer | B60N 2/4814 |
| | | | 297/216.12 |
| 2008/0185882 A1 * | 8/2008 | Humer | B60N 2/4228 |
| | | | 297/216.12 |
| 2008/0252112 A1 * | 10/2008 | Alexander | B60N 2/4885 |
| | | | 297/216.12 |
| 2008/0252113 A1 * | 10/2008 | Alexander | B60N 2/4885 |
| | | | 297/216.12 |
| 2009/0102254 A1 * | 4/2009 | Veine | B60N 2/4885 |
| | | | 297/216.12 |
| 2009/0234544 A1 * | 9/2009 | Humer | B60N 2/4228 |
| | | | 297/216.12 X |
| 2009/0243355 A1 * | 10/2009 | Heeg | B60N 2/42763 |
| | | | 297/216.12 |
| 2012/0126593 A1 * | 5/2012 | Niitsuma | B60N 2/4885 |
| | | | 297/216.12 |
| 2015/0251577 A1 * | 9/2015 | Ishihara | B60N 2/4814 |
| | | | 297/216.12 |
| 2015/0258924 A1 * | 9/2015 | Ishihara | B60N 2/4817 |
| | | | 297/216.12 |

* cited by examiner

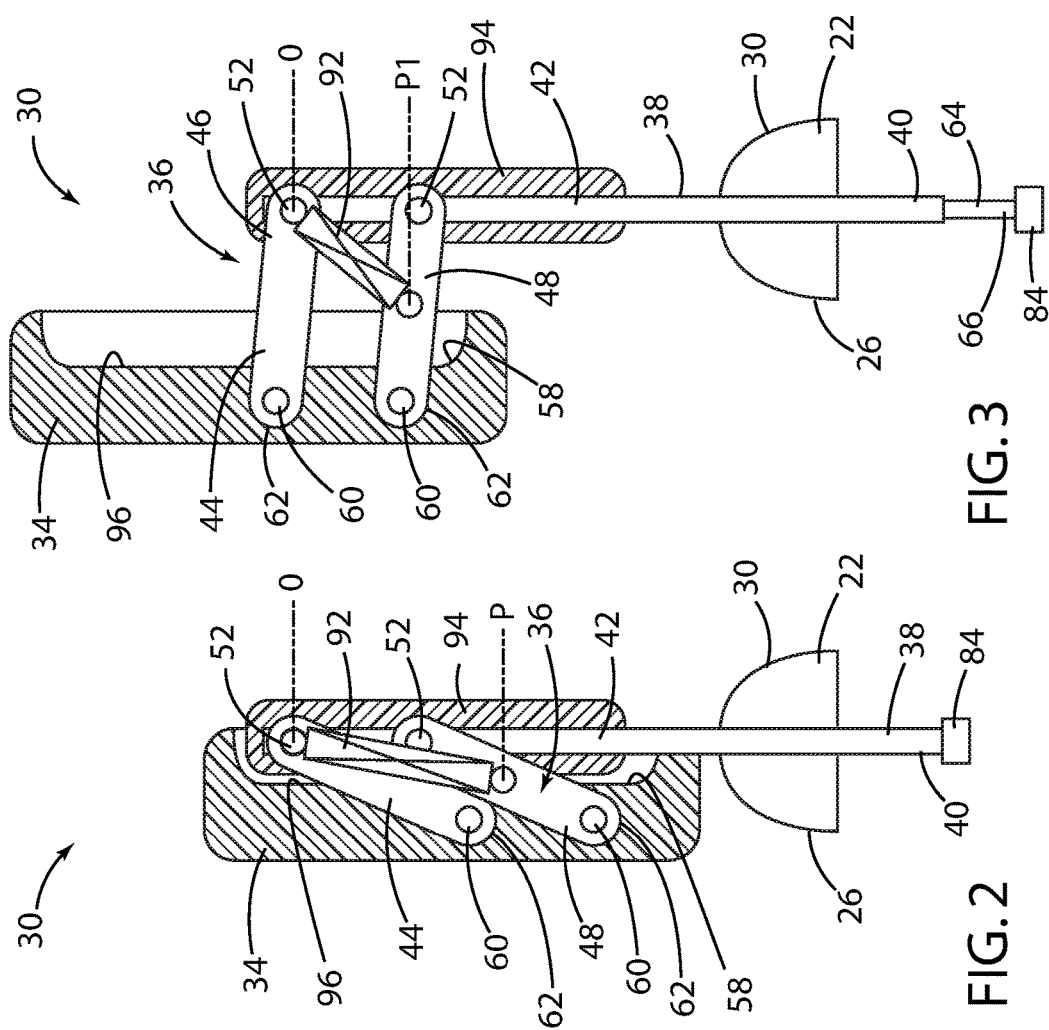

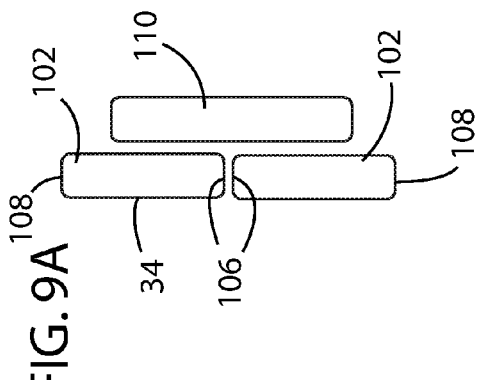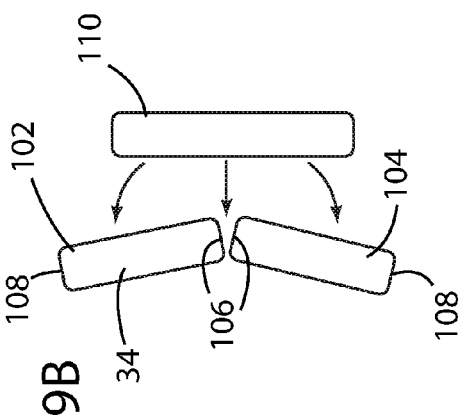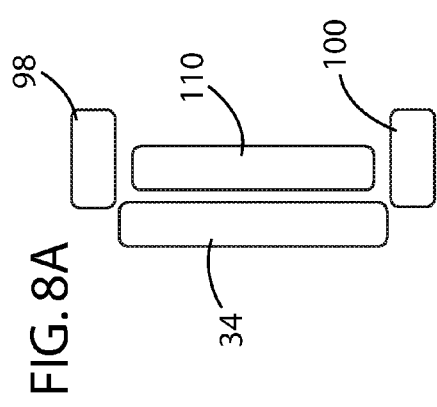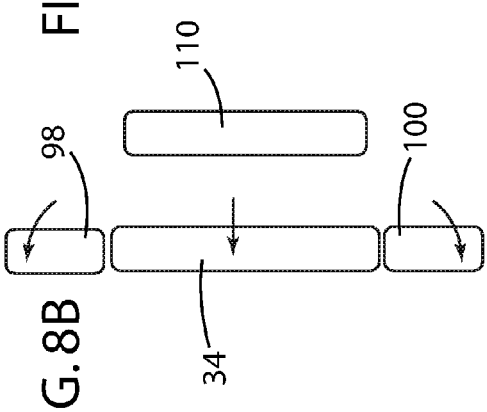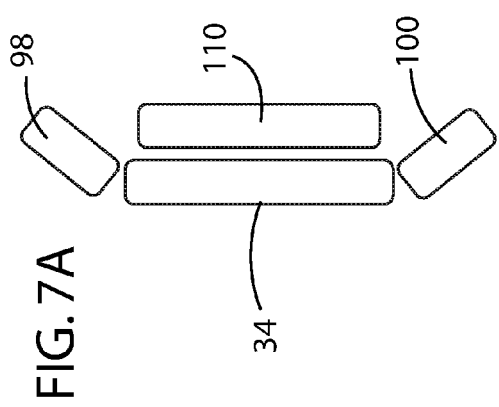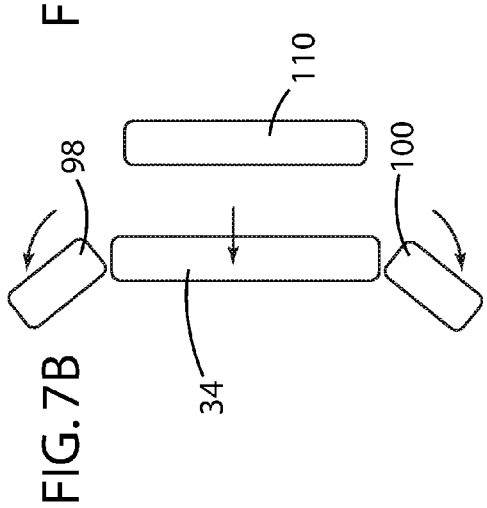

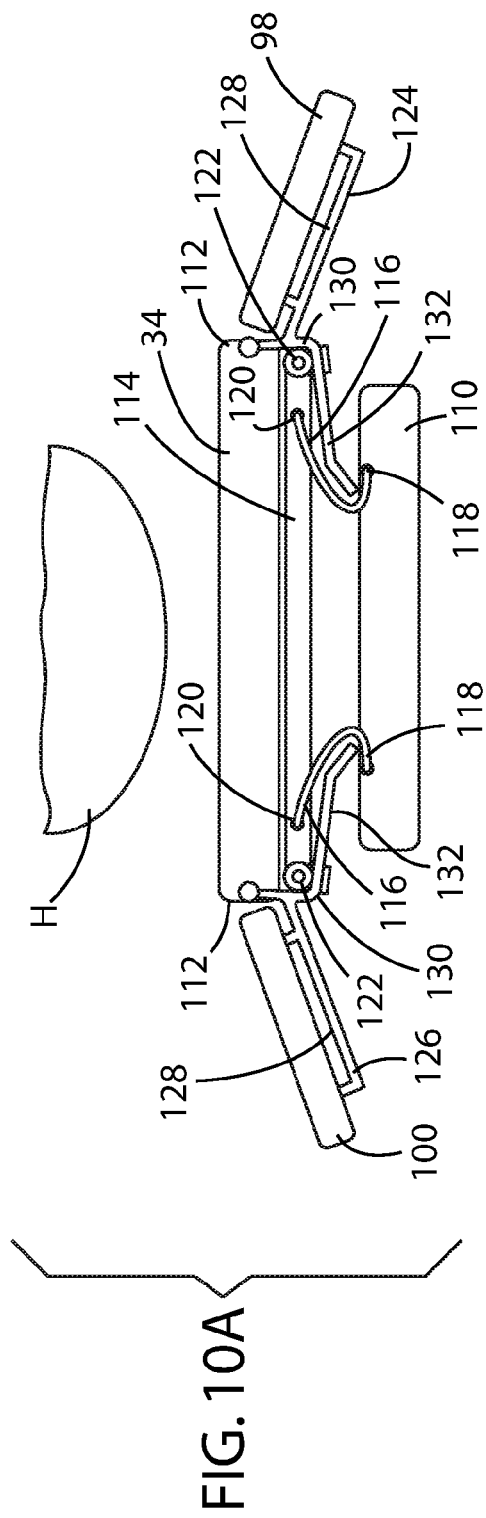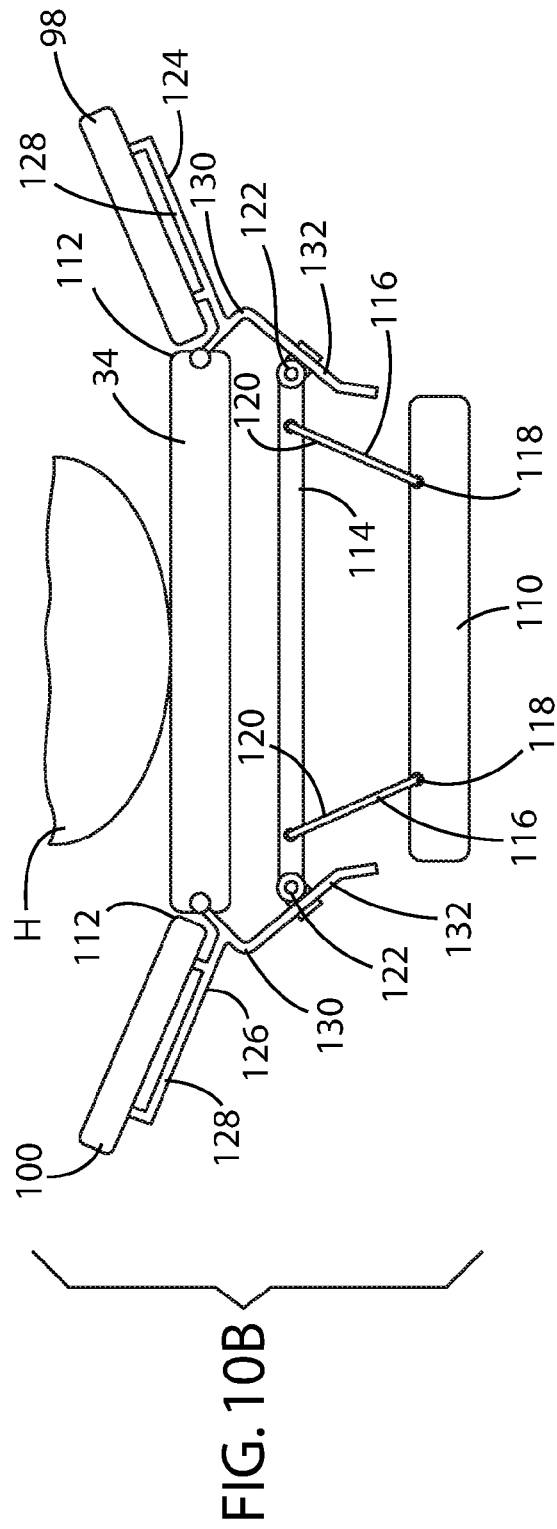
FIG. 10A
FIG. 10B

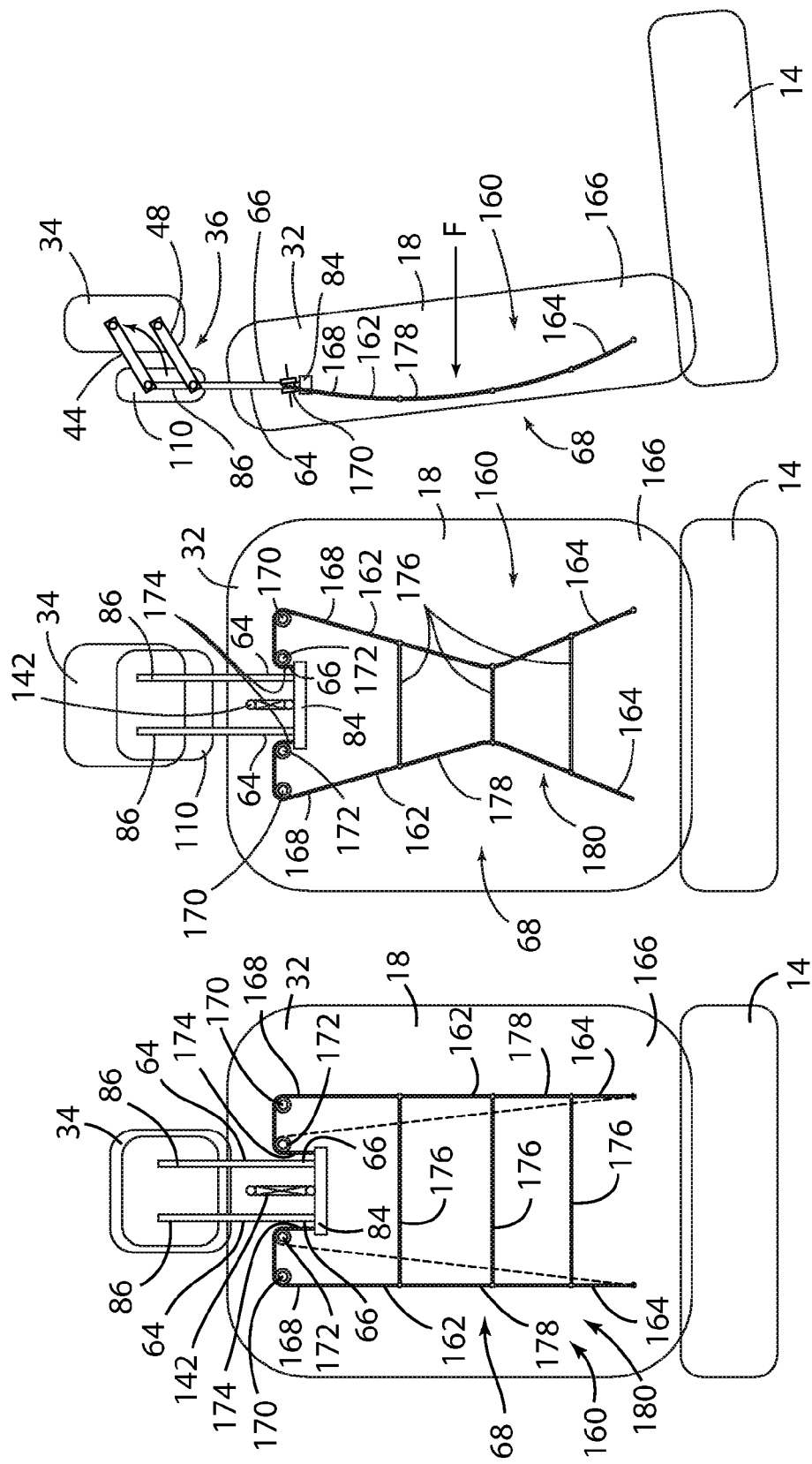

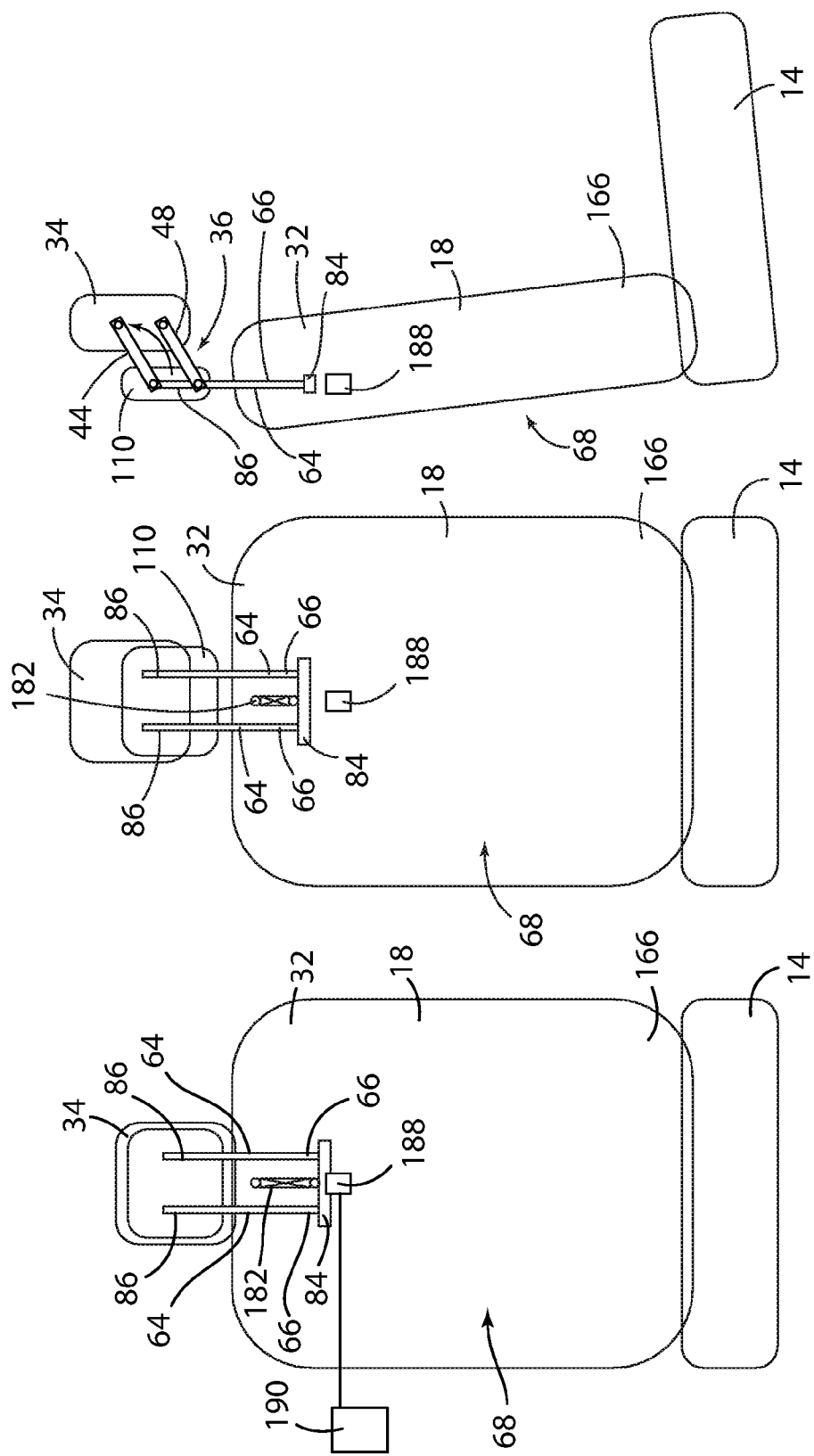

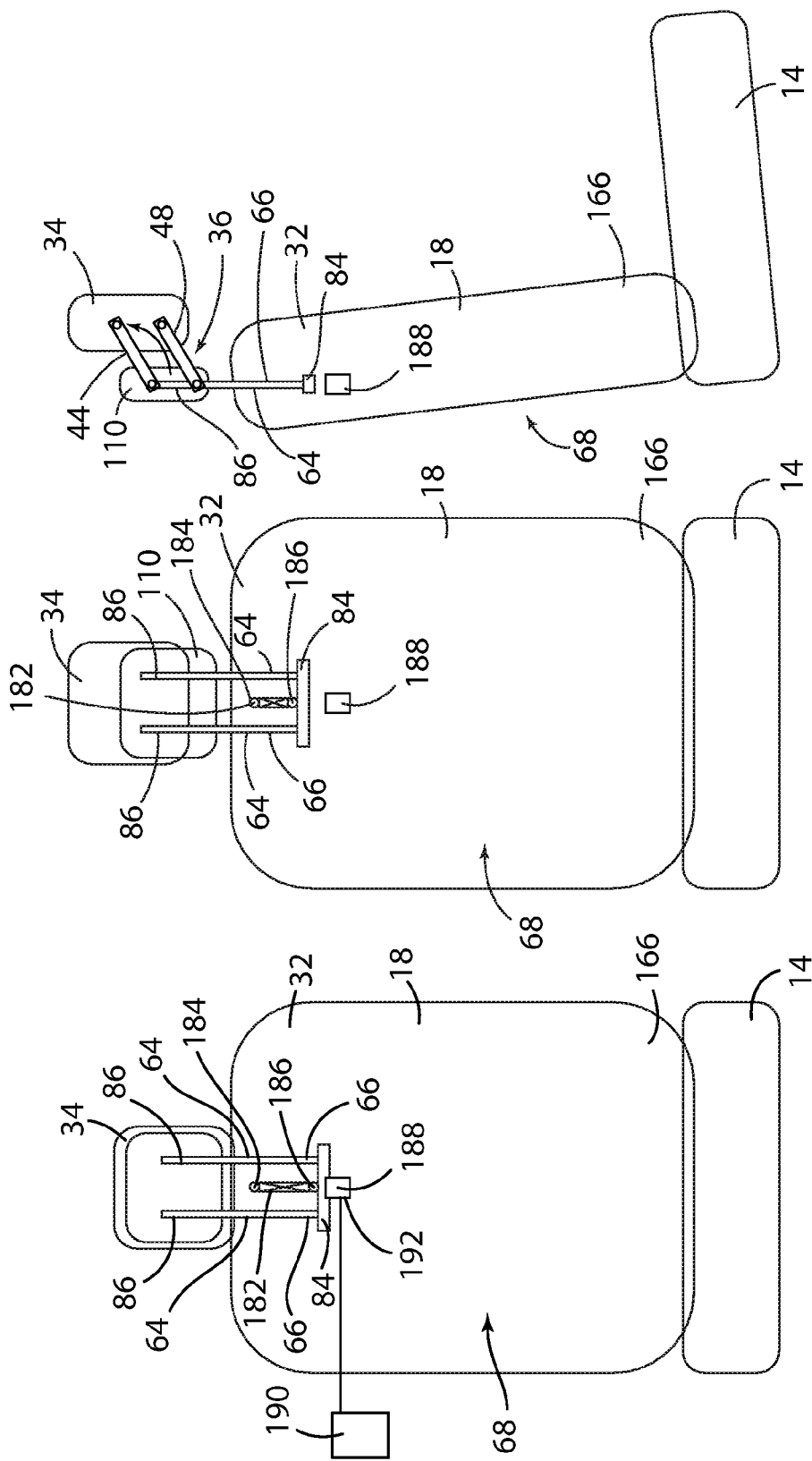

ACTIVE HEAD RESTRAINT

FIELD OF THE INVENTION

The present disclosure generally relates to a motor vehicle head restraint and, more particularly, to an active head restraint that deploys forward and upward and expands sideways from a fixed position to cushion the occupant's head in a rear impact event.

BACKGROUND OF THE INVENTION

Seating assemblies for motor vehicles often employ a head restraint affixed to an upper portion of an upwardly extending seating assembly seatback. The primary function of such a head restraint is to provide an appropriate and often padded surface against which the back of an occupant's head might be restrained to prevent abrupt rearward motion of the occupant's head and injurious displacement of the upper cervical portion of the spine during a rear impact event. A head restraint thus protects the occupant from neck injuries in rear impact crashes.

In some seating assembly designs, the head restraint is fixed. However, head restraints function optimally when they are closest to the head and at a proper height relative the occupant, which is often difficult to achieve with fixed headrests in view of the wide variety of occupant sizes, while promoting the comfort of the occupant. In view of this shortcoming of fixed head restraints, other seating assembly designs employ a head restraint that is movable in the vertical direction relative the seating assembly seatback. However, in most instances, vertically movable head restraints are positioned sub-optimally relative their ability to provide an effective restraint. Also, in angular rear impacts, the occupant's head may not be properly restrained. An improvement over such head restraints was desired.

SUMMARY OF THE INVENTION

According to one aspect of the present disclosure, a simple, robust, low-cost, and light-weight active head restraint for a seating assembly of a motor vehicle comprises a structural support for a seatback of the seating assembly, a movable head restraint pad having a stowed position and a deployed position, and a linkage deployment mechanism pivotably attached to the movable head restraint pad. The linkage deployment mechanism comprises an upper bar pivotally attached at a forward end to a rear surface of the movable head restraint pad and pivotally attached at a rearward end to an outer tube fixed to an upper portion of the structural support and a lower bar pivotally attached at a forward end to the rear surface of the movable head restraint pad and pivotally attached at a rearward end to the outer tube. An inner linkage is disposed within and adapted to reciprocate vertically within the outer tube between a lower stowed position and a raised deployed position. A trigger mechanism is operatively connected with a lower end of the inner linkage and urges the inner linkage to its raised deployed position in response to a rear impact event. An actuating link has a first end pivotally coupled with an upper end of the inner linkage and a second end pivotally and operatively connected with a mid-length position on the lower bar, wherein upon the rear impact event, the inner linkage is raised from its lower stowed position to its raised deployed position, and the first end of the link is raised upward and applies an upward force to the lower bar to deploy the movable head restraint pad of the active head restraint forward and upward from its stowed position to its deployed position to restrain the occupant's head during the rear impact event.

According to another aspect of the present disclosure, a head restraint comprises a movable pad, a bar pivotally attached at a forward end to the movable pad and at a rearward end to an outer tube, an inner tube disposed within the outer tube, a link coupled with the bar and inner tube, and a trigger operably connected with the inner tube, wherein upon a rear impact, the inner tube urges the link to apply an upward force to the bar.

According to yet another aspect of the present disclosure, an active head restraint for a seating assembly comprises a movable head restraint pad and a linkage deployment mechanism comprising a four bar deployment mechanism, wherein the bars are pivotally attached at a forward end to the movable head restraint pad and at a rearward end to an outer tube and the upper and lower bars of the four bar deployment mechanism are arranged in parallel orientation with the forward end of each of the upper and lower bars extending downwardly relative the outer tube when the movable head restraint pad is in the stowed position and the upper and lower bars are moved to a parallel orientation with the forward end of each of the upper and lower bars extending substantially forward and upward when the movable restraint pad is in the deployed position. An inner tube is disposed within the outer tube, a link is coupled with at least one of the lower bars and inner tube, and a trigger mechanism is coupled with the inner tube, wherein upon a rear impact, the inner tube urges the link to apply an upward force to the at least one lower bar.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2 is a cross-sectional side view of the active head restraint of FIG. 1 according to the present disclosure in the stowed position;

FIG. 3 is a cross-sectional side view of the active head restraint of FIG. 1 according to the present disclosure in the deployed position;

FIGS. 7A-7B are top schematic views of a first embodiment of the movable head restraint pad and side extensions of the active head restraint of FIG. 1 according to the present disclosure in the stowed and the deployed positions, respectively;

FIGS. 8A-8B are top schematic views of a second embodiment of the movable head restraint pad and side extensions of the active head restraint of FIG. 1 according to the present disclosure in the stowed and the deployed positions, respectively;

FIGS. 9A-9B are top schematic views of a third embodiment of the movable head restraint pad and side extensions of the active head restraint of FIG. 1 according to the present disclosure in the stowed and the deployed positions, respectively;

FIGS. 10A-10B are top schematic views of the first embodiment of the movable head restraint pad, side extensions and side linkages of the active head restraint of FIG. 1 according to the present disclosure in the stowed and the deployed positions, respectively;

FIGS. 11A-11C are front and side top schematic views of a first embodiment of the trigger mechanism of the active head restraint of FIG. 1 according to the present disclosure in the stowed and the deployed positions, respectively;

FIGS. 13A-13C are front and side top schematic views of a second embodiment of the trigger mechanism of the active head restraint of FIG. 1 according to the present disclosure in the stowed and the deployed positions, respectively;

FIGS. 14A-14C are front and side top schematic views of a third embodiment of the trigger mechanism of the active head restraint of FIG. 1 according to the present disclosure in the stowed and the deployed positions, respectively.

DETAILED DESCRIPTION OF THE EMBODIMENTS

Figure 1:
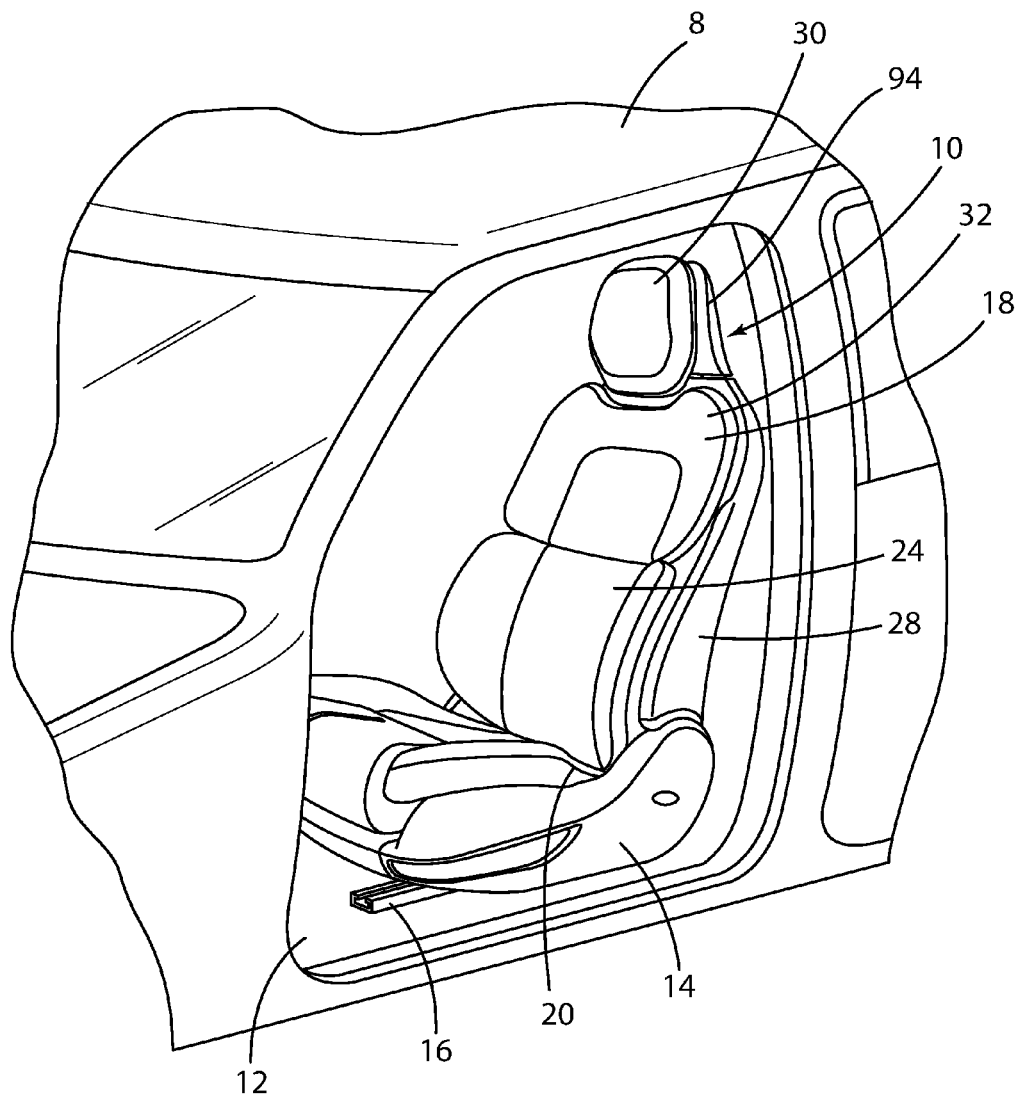
FIG. 1 is a perspective side view of a motor vehicle provided with a seating assembly having the active head restraint of the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Referring to FIGS. 1 and 2, reference numeral 8 generally designates a motor vehicle 8 having one or more seating assemblies 10 affixed to a floor 12 or similar structure within the motor vehicle 8. The seating assembly 10 includes a lower seating cushion assembly 14 supported by a frame 16 attached to the floor 12 and a seatback 18 extending vertically upward from a rear portion 20 of the lower seating cushion assembly 14. Often, the seatback 18 is pivotally attached to the rear portion 20 of the lower seating cushion assembly 14 in order to provide multiple reclining seating positions or to allow the seatback 18 to pivot forward to allow occupant entrance and egress relative the motor vehicle 8.

The seatback 18 generally consists of an interior support structure 22. Typically, one or more cushion assemblies 24 having an interior spring support system, foam padding, and an exterior cover stock (not shown) are attached to a forward portion 26 of the seatback support structure 22. A seatback cover or panel 28 is likewise typically attached to a rearward portion of the seatback support structure 22 and thereby encloses the seatback 18 in an aesthetically pleasing manner.

As shown in FIG. 1, the active head restraint 30 of the present disclosure is shown affixed to an upper portion 32 of the seatback 18. As further shown in FIGS. 2, 3, 7A, 7B, 8A, 8B, 9A, 9B, 10A and 10B, the active head restraint 30 of the present disclosure is designed to deploy forward and upward, as well as expand sideways, from a fixed position to restrain the occupant's head during a rear impact event. The active head restraint 30 of the present disclosure comprises a movable head restraint pad 34 pivotably attached to a linkage deployment mechanism, preferably comprising a four bar deployment mechanism 36. The four bar deployment mechanism 36 is mounted to the upper portion 32 of the seatback 18, such as the seatback support structure 22, and is supported by a pair of vertically extending outer tubes 38 fixed to the upper portion 32 of the seatback 18. That is, a lower end 40 of each of the outer tubes 38 is fixedly attached to the interior structural support, such as seatback support structure 22, and an upper end 42 of each of the outer tubes 38 extends vertically upward to support the four bar deployment mechanism 36.

The four bar deployment mechanism 36 includes a pair of upper bars 44 pivotally attached at a rearward end 46 to the upper end 42 of each of the outer tubes 38, and a pair of lower bars 48 pivotally attached at a rearward end 50 to the upper end 42 of each of the outer tubes 38. A pivot pin 52 extends through the outer tube 38 to engage each of the rearward ends 46, 50 of the upper bar 44 and the lower bar 48, respectively, to allow pivotable rotation of the upper and lower bars 44, 48 relative a respective outer tube 38. A forward end 54 of the upper bar 44 and a forward end 56 of the lower bar 48 are each pivotally attached to a rear surface 58 of the movable head restraint pad 34 via pivot pins 60 extending through the forward end 54, 56 of the upper and lower bars 44, 48 and preferably engaging a pivot mount 62 structurally integrated into or onto the rear surface 58 of the movable head restraint pad 34. The vertical distance between the pivot pins 52 extending through the rearward ends 46, 50 of each of the upper and lower bars 44, 48 and the pivot pins 60 extending through the forward ends of each of the upper and lower bars 44, 48 is preferably the same and the four bar deployment mechanism 36, upper end 42 of the outer tube 38 and rear surface 58 of the movable head restraint pad 34 forms a variable parallelogram.

The active head restraint 30 preferably further includes inner linkages, preferably inner tubes 64, which are each disposed within each of the outer tubes 38 and adapted to reciprocate vertically therein. A lower end 66 of the inner tube 64 is operably connected with a trigger mechanism 68, discussed in further detail below. While an inner tube 64 is disclosed herein, it should be understood that the tube-like structure of the inner tube 64 can be replaced with a rod to provide the linkage described herein. An upper end 86 of each of the inner tubes 64 is pivotally coupled to a first end 70 of a pair of actuating links 72, as shown in FIGS. 2-5, by a pivot pin 74.

Figure 4:
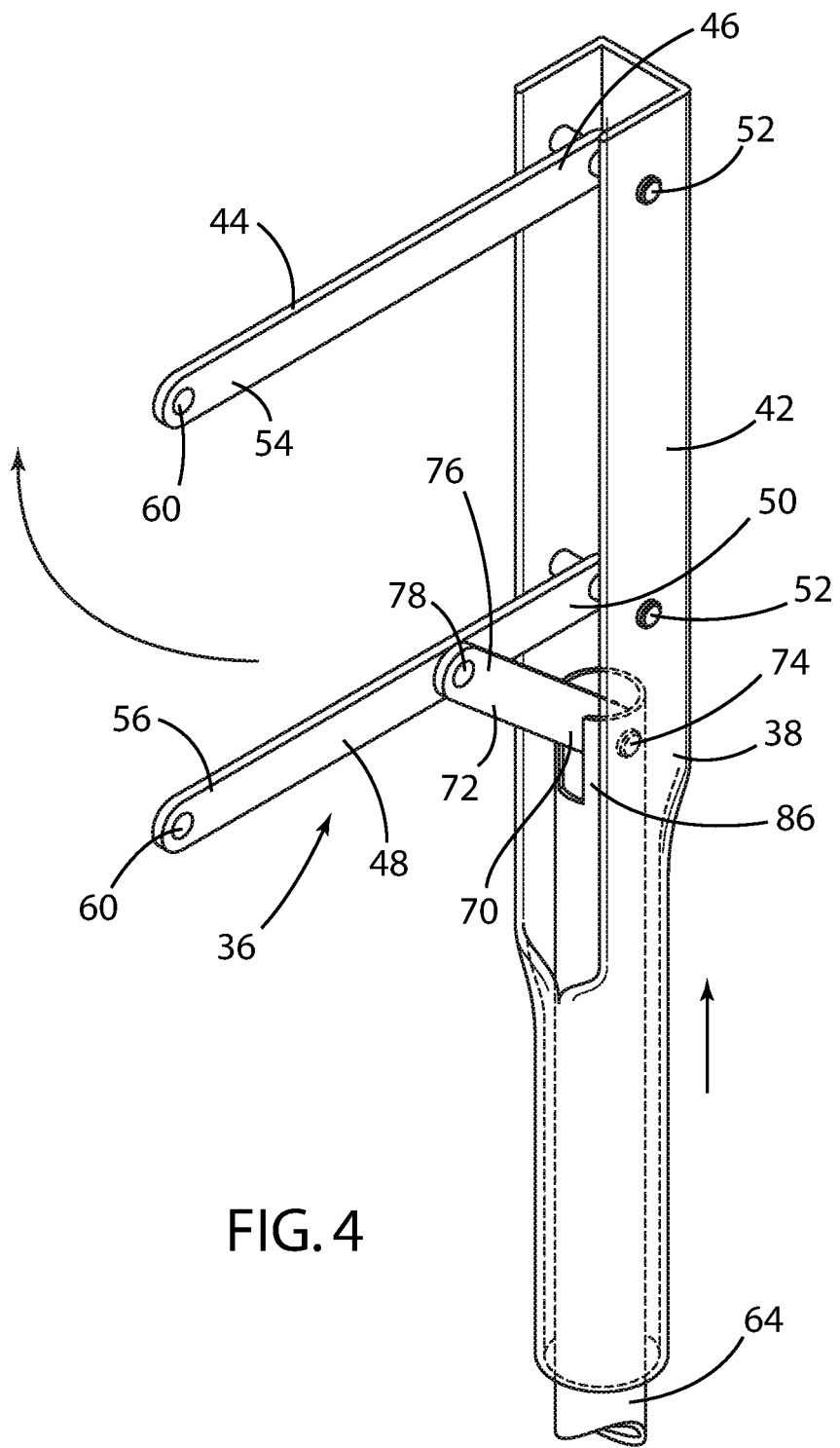
FIG. 4 is a perspective view of the four bar deployment mechanism and inner and outer tube of the active head restraint of FIG. 1 according to the present disclosure in the deployed position.
Figure 5:
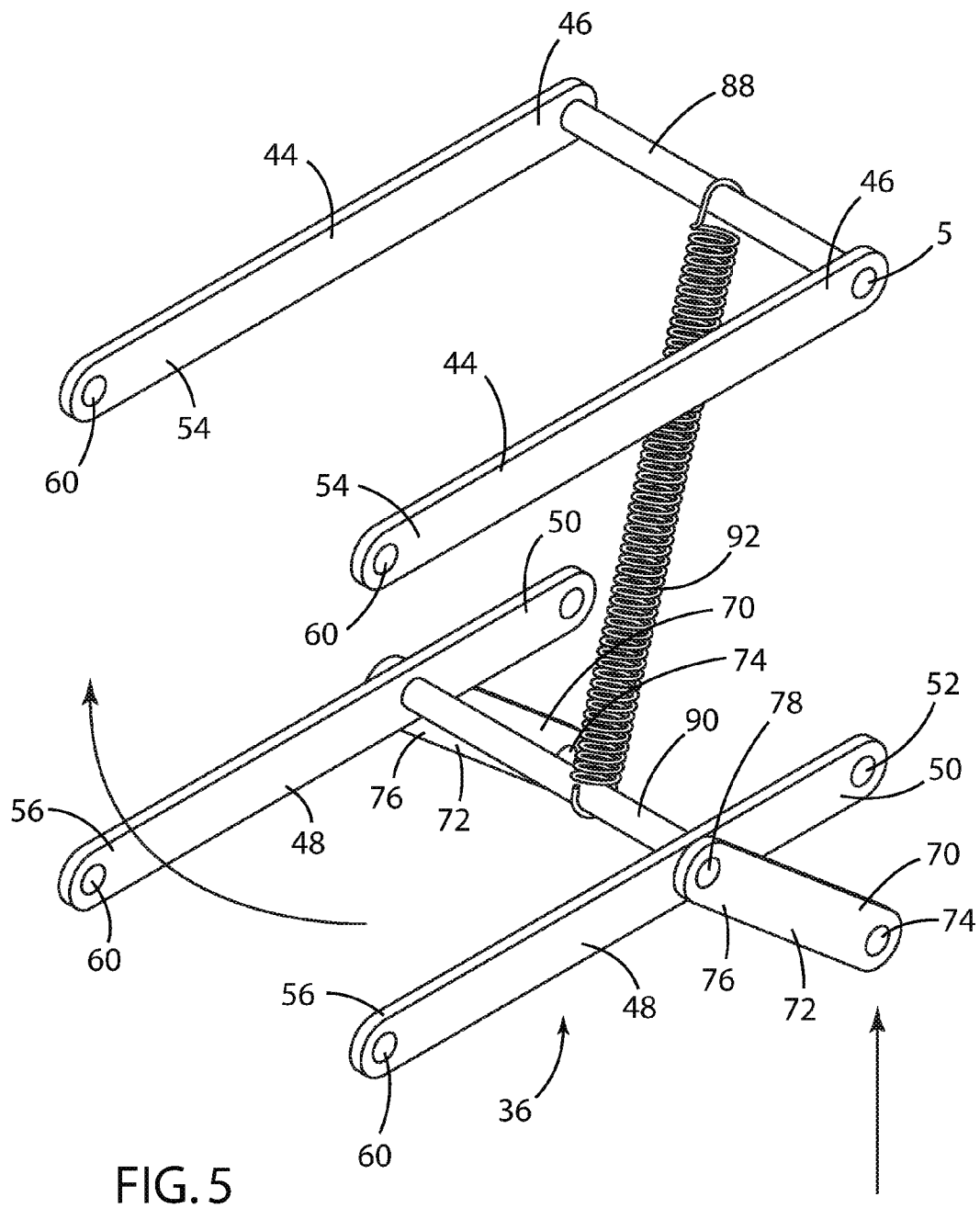
FIG. 5 is a perspective view of a first embodiment of the four bar deployment mechanism of the active head restraint of FIG. 1 according to the present disclosure in the deployed position.
Figure 6:
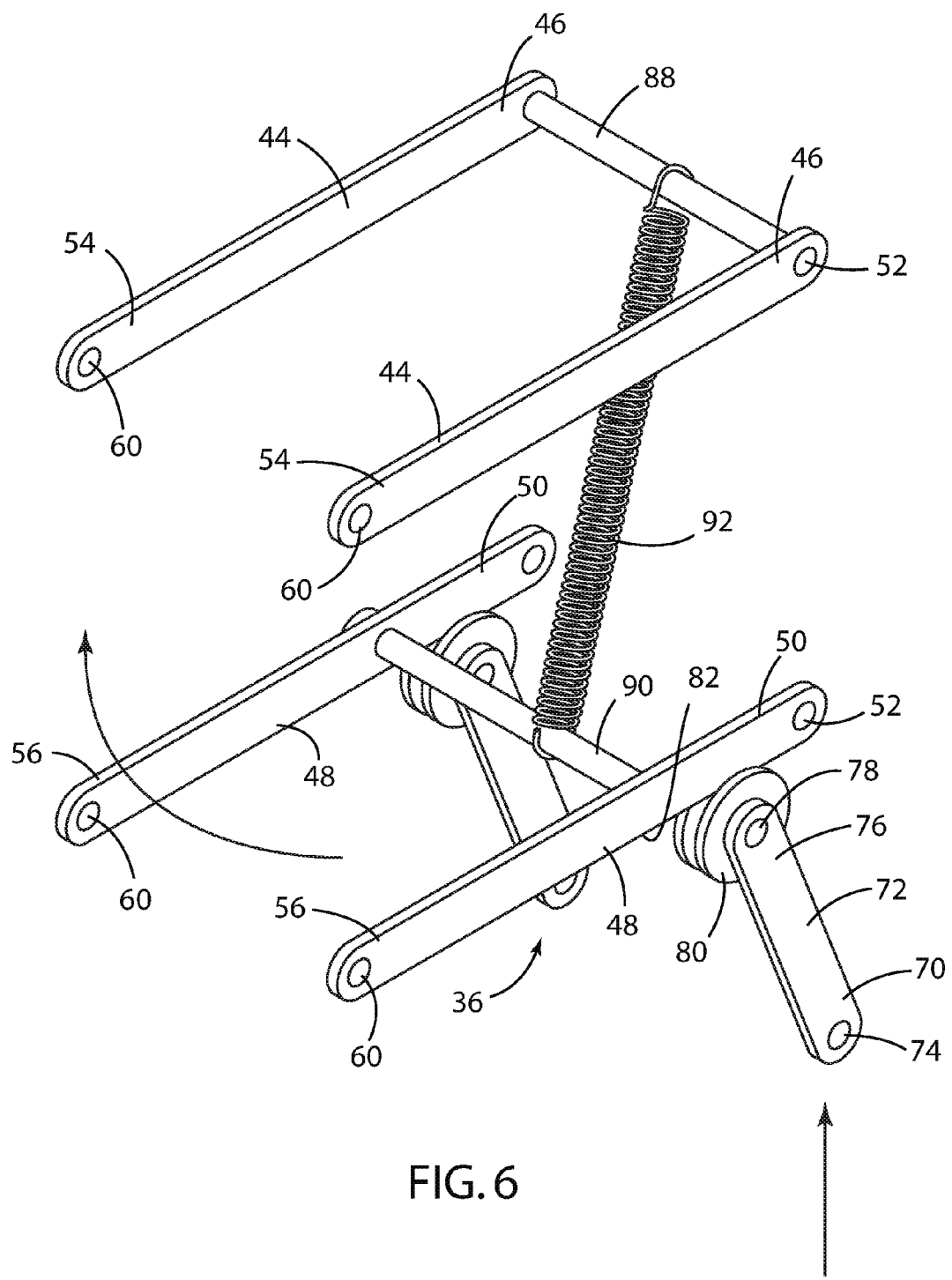
FIG. 6 is another perspective view of a second embodiment of the four bar deployment mechanism of the active head restraint of FIG. 1 according to the present disclosure in the deployed position.

A second end 76 of each of the actuating links 72 is pivotally and operatively coupled to a mid-length position on each of the lower bars 48. As shown in FIGS. 4-5, this pivotable coupling can be accomplished via a pivot pen 78 extending through the second end 76 of each of the actuating links 72 and the mid-length position, preferably proximate the middle thereof, on each of the lower bars 48. Alternatively, the pivotable attachment can be accomplished via a roller 80 attached to the second end 76 of the actuating link 72 and arranged in juxtaposed relationship with a lower edge 82 of each of the lower bars 48, as best shown in FIG. 6.

As further discussed below, with the outer tubes 38 fixed to the upper seatback support structure 22, a support plate 84 pushes the inner tubes 64 upward to deploy the active head restraint 30. As the inner tube 64 is raised from a stowed position to a deployed position, the upper end 86 of the inner tube 64, to which the first end 70 of the actuating link 72 is pivotally attached, is raised upwardly. The first end 70 of the actuating link 72 is likewise raised, causing the second end 76 of the actuating link 72 to apply an upward force to each of the lower bars 48, which thereby raises the four bar deployment mechanism 36 from a stowed position to a deployed position.

Thus, the movable head restraint pad 34 of the active head restraint 30 of the present disclosure is designed to deploy forward and upward from a fixed position to restrain the occupant's head H during a rear impact event. That is, in a stowed position, the upper and lower bars 44, 48 of the four bar deployment mechanism 36 are arranged in parallel orientation with the forward end 54, 56 of each of the upper and lower bars 44, 48 extending downwardly relative the outer tube 38. Conversely in the deployed position, the upper and lower bars 44, 48 are moved in parallel, where the upper and lower bars 44, 48 are arranged in parallel orientation with the forward end 54, 56 of each of the upper and lower bars 44, 48 extending substantially forward and upward, as best seen in FIGS. 3-5. The movable head restraint pad 34 attached to the forward end 54, 56 of each of the upper and lower bars 44, 48 is likewise displaced and moved to a forward and upward orientation relative the stowed position. The disclosed four bar deployment mechanism 36 rotates the movable head restraint pad 34 forward and up in an arc of a circle. This motion moves the movable head restraint pad 34 first forward and then up, thus slowing impact with the head H.

Preferably, the active head restraint 30 also includes a pair of rods 88, 90 that extend laterally across the active head restraint 30, where the first rod 88 is coaxially aligned with the pivots that couple the rearward end 46 of each of the upper bars 44 to the outer tube 38, and the second rod 90 is coaxially aligned with the mid-length position on each of the lower bars 48, preferably coinciding with the location of the pivot pin 78, to which the actuating link 72 is attached to each of the lower bars 48. A tension spring 92 preferably extends in tension between and is mounted to each of the pair of rods 88, 90 and is provided to balance the mass of the movable head restraint pad 34 and thereby to adjust and control the upward force required from the actuating link 72 to deploy the movable head restraint pad 34 from a stowed to a deployed position. In particular, the tension spring 92 is mounted and disposed between the points O and P in the stowed condition, shown in FIG. 2, and between the points O and P1 in the deployed condition, shown in FIG. 3, for balancing the mass of the movable head restraint pad 34. Advantageously, the tension spring 92 can be especially tuned to the mass of the movable head restraint pad 34 and the upper and lower bars 44, 48 to contribute to the upward force required to deploy the movable head restraint pad 34.

The active head restraint 30 also preferably includes a rear trim panel 94 that encases the rear surface 58 of the movable head restraint pad 34 to provide an aesthetically pleasing design and is mounted to the rear of the pair of outer tubes 38. The movable head restraint pad 34 is preferably provided with a recess 96 in its rear surface 58 that corresponds with and receives the rear trim panel 94 when the movable head restraint pad 34 is in its stowed position. Thus, the four bar deployment mechanism 36 described above can be neatly concealed when the movable head restraint pad 34 is in its stowed position.

Preferably, the active head restraint 30 is provided with side extensions 98, 100. Three embodiments of such side extensions 98, 100 are shown in FIGS. 7A-10B. In a first embodiment, best shown FIGS. 7A, 7B, 10A, and 10B, the side extensions 98 100 are inclined rearwardly and angled at an oblique angle in their first stowed position relative the movable head restraint pad 34. The side extensions 98, 100 are forwardly angled at an oblique angle in their second deployed position relative the movable head restraint pad 34 to form side restraints disposed to restrain the head H of an occupant from lateral movement.

In a second embodiment of the side extensions 98, 100, the side extensions 98, 100 extend rearwardly in a folded orientation relative the movable head restraint pad 34 when in the first stowed position. However, when in the second deployed position, the side extensions 98, 100 fold forwardly to extend laterally outwardly relative the movable head restraint pad 34, as best seen in FIGS. 8A and 8B, to form a wider surface against which to restrain the head H of the occupant.

In yet a third embodiment of the side extensions 98, 100, the movable head restraint pad 34 itself comprises a pair of side-by-side laterally disposed pads 102, 104, where an inner edge 106 of the side-by-side laterally disposed pads 102, 104 is arranged in abutting relationship with each other and an outer edge 108 of the side-by-side laterally disposed pads 102, 104 extend laterally outwardly when in the first stowed position. When in the second deployed position, however, the outer edges 108 of the side-by-side laterally disposed pads 102, 104 are moved forward relative the inner edges 106 of the side-by-side laterally disposed pads 102, 104 to form a generally concave enclosure which is disposed to restrain the head H of an occupant from lateral movement.

Common to each of the first and second embodiments of the side extensions 98, 100, the active head restraint 30 comprises a fixed head restraint base 110, the movable head restraint pad 34, and the pair of side extensions 98, 100 disposed proximate each side edge 112 of the movable head restraint pad 34. A center roller brace 114 is disposed between the fixed head restraint base 110 and the movable head restraint pad 34 and is attached to the fixed head restraint base 110 by a pair of symmetrically spaced roller brace connectors 116 attached at a first end 118 to the fixed head restraint base 110 and at a second end 120 to the center roller brace 114. Preferably, the symmetrically spaced roller brace connectors 116 comprise a pair of flexible tethers, as shown in FIGS. 10A and 10B. A roller 122 is disposed at each end of the center roller brace 114. A pair of symmetrical side linkages 124, 126 comprises a first portion 128 fixedly mounted to one of the side extensions 98, 100, a middle portion 130 pivotably mounted to the side edge 112 of the movable head restraint pad 34, and a second portion 132 obliquely to the first portion 128 of the side linkages 124, 126 and operably connected with each of the rollers 122 on the center roller brace 114.

To actuate the side extensions 98, 100, the movable head restraint pad 34 is caused to move forward and upward, as described above. As it does so, the second portion 132 of the side linkages 124, 126 moves forward and thereby moves center roller brace 114 forward until the roller brace connectors 116 become taut to prevent further forward motion of the center roller brace 114. The rollers 122 on the end of center roller brace 114 then act simultaneously against the second portion 132 of the side linkages 124, 126 to pivot the second portion 132 of the side linkages 124, 126 outwardly relative the movable head restraint pad 34. The side linkages 124, 126 are thus rotated forward relative the movable head restraint pad 34 and the side extensions 98, 100, which are fixedly connected to the first portion 128 of the side linkages 124, 126, are likewise rotated forward and at an oblique angle relative the movable head restraint pad 34.

In the case of the third embodiment, the first portion 128 of the side linkages 124, 126 is pivotally mounted proximate and to behind the abutting inner edges 106 of the side-by-side laterally disposed pads 102, 104. The second portion 132 of the side linkages 124, 126 is instead connected to the outer edges 108 of the side-by-side laterally disposed pads 102, 104. As the roller brace connector 116 becomes taut due to forward motion of the movable head restraint pad 34, the rollers 122 on the end of the center roller brace 114 urge the middle portion 130 of the side linkages 124, 126 outward, which, in turn, causes the second portion 132 of the side linkages 124, 126 to rotate the outer edges 108 of the side-by-side laterally disposed pads 102, 104 forward relative the inner edge 106 of the side-by-side laterally disposed pads 102, 104 to form a generally concave enclosure which is disposed to restrain the head H of an occupant from lateral movement.

Figure 12:
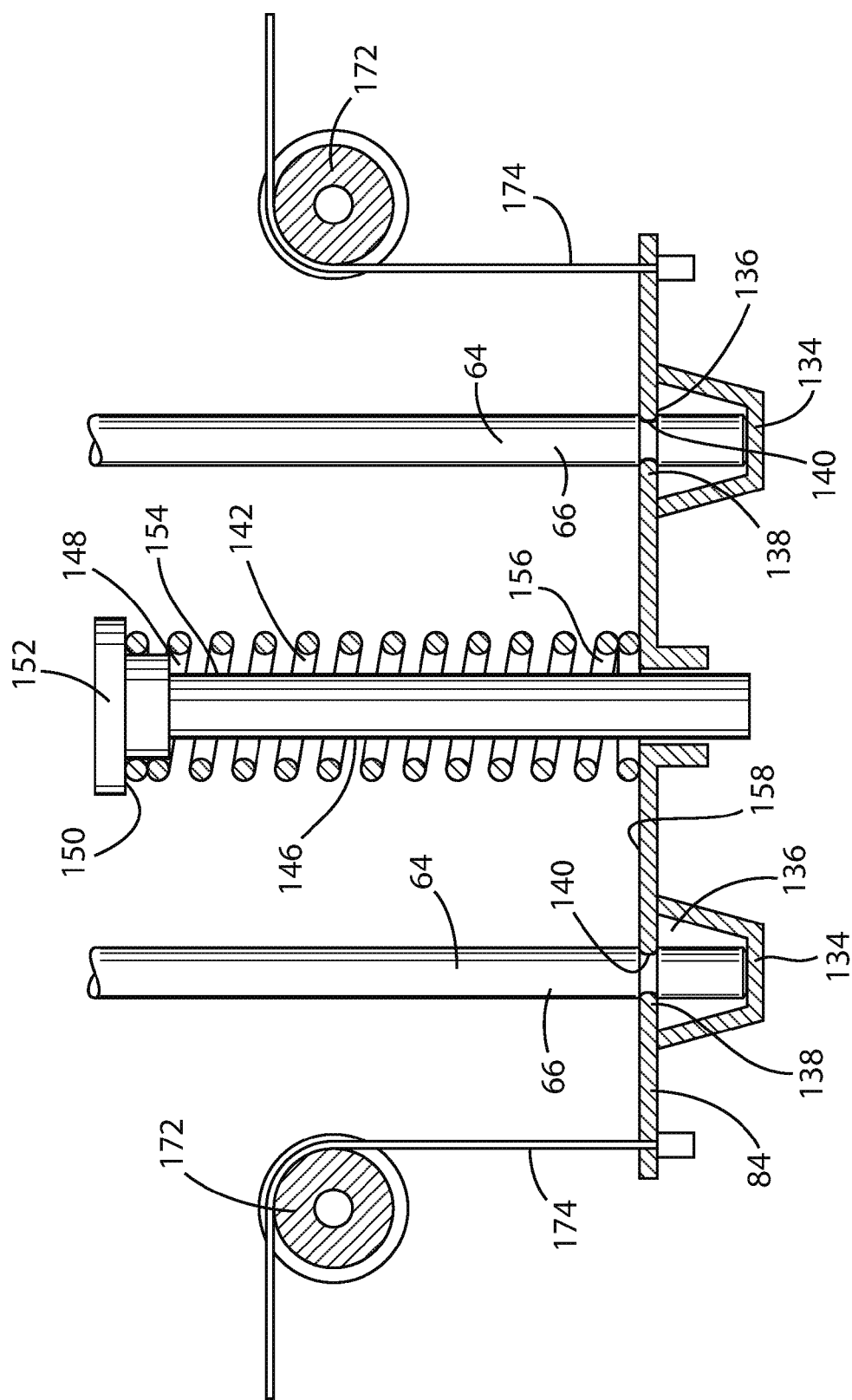
FIG. 12 is a front cross-sectional view of the support plate, the lower inner tubes, and compression spring of the first embodiment of the trigger mechanism of the active head restraint of FIG. 1 according to the present disclosure in the stowed and the deployed positions, respectively.
Figures 15A, 15B, 15C:
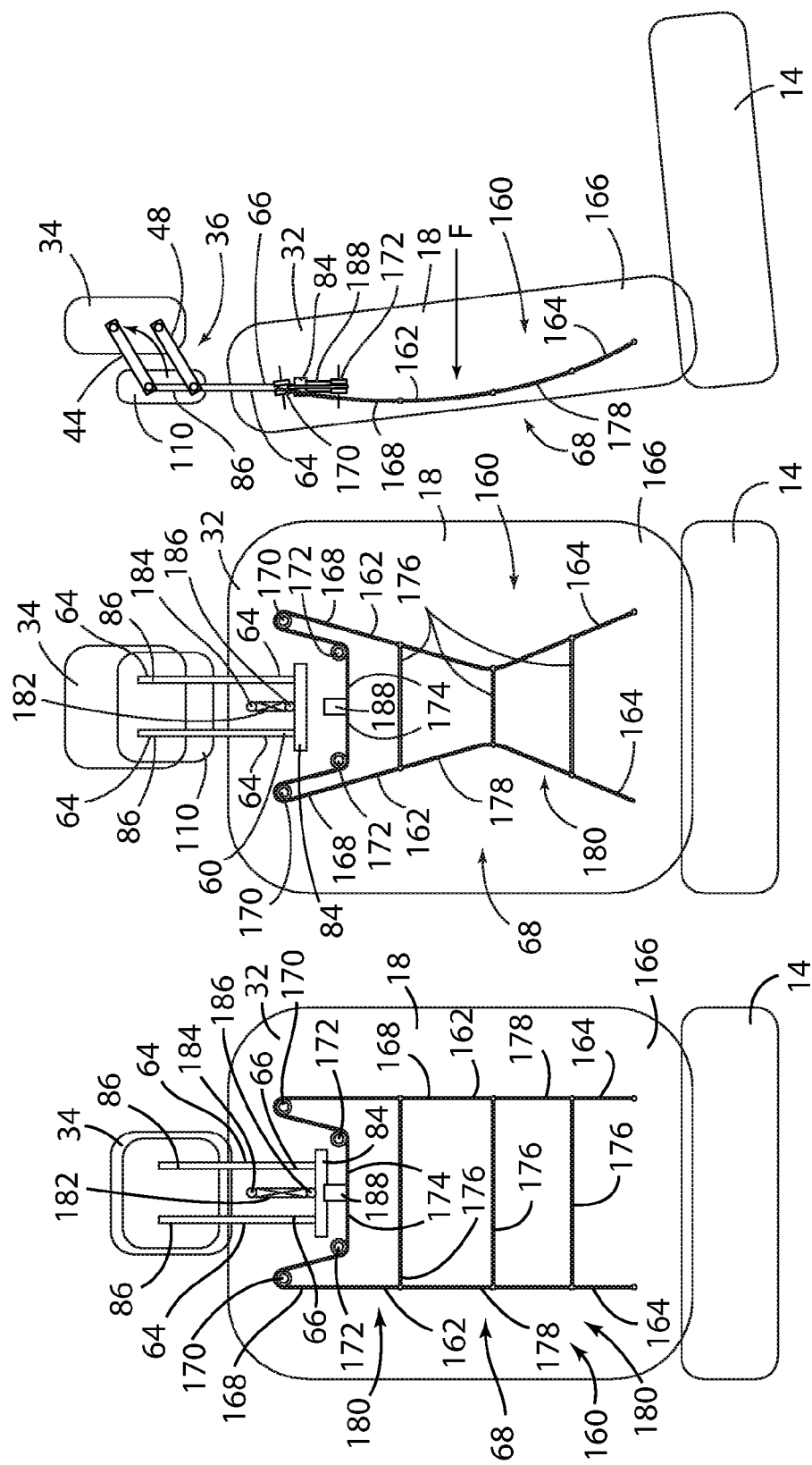
FIGS. 15A-15C are front and side top schematic views of a fourth embodiment of the trigger mechanism of the active head restraint of FIG. 1 according to the present disclosure in the stowed and the deployed positions, respectively.

In accordance with the present disclosure, the trigger mechanism 68 can assume multiple configurations and embodiments, each of which may be operatively coupled with the lower end 66 of the inner tube 64 to urge the inner tube 64 to its raised deployed position in response to a rear impact event. Common to each of the embodiments, the trigger mechanism includes the aforementioned support plate 84 disposed within an upper portion 32 of the seatback 18. The support plate 84 is preferably attached to the lower ends of the inner tube 64, as shown in FIG. 12. The support plate 84 preferably includes a pair of inner tube receiving sockets 134, each provided with a resilient connector 136, such as a deflectable metal edge 138 that engages a recess or notch 140 proximate the lower end 66 of the inner tube 64. Alternatively, the resilient connector 136 can be a spring-loaded extending button incorporated in the support plate proximate an outer periphery of the receiving socket (not shown), which resiliently engages a recess in the lower end 66 of the inner tube 64. In either configuration, the assemblies provide a snap-in and click-fit design, whereby the lower end 66 of the inner tube 64 can be quickly, reliably, and operably connected with the support plate 84. It should be noted that as an alternate configuration, additional linkages may be adopted that might allow deployment of the movable head restraint pad 34 by pulling the inner tubes 64 downwardly within the outer tubes 38 relative the support plate 84. However, attachment of the inner tubes 64 to the support plate 84 would not be possible, and the inner tubes 64 may not be easily snapped in place.

In a first embodiment of the trigger mechanism 68, shown in FIGS. 11A-12, a compression spring 142 is vertically disposed about a vertical guide 146. A first upper end 148 of the compression spring 142 is in abutting relation with and in compression against a lower surface 150 of a spring stop 152 forming an upper portion 154 of the vertical guide 146, and a second lower end 156 of the compression spring 142 is in compression against an upper surface 158 of the support plate 84. In its stowed condition, the compression spring 142 is normally extended and gently urges the support plate 84 downwardly at a first force. This corresponds to the stowed position of the movable head restraint pad 34.

As shown in FIGS. 11A-11C, in this first embodiment, the vertically extending seatback 18 includes a cable pulley system 160. The cable pulley system 160 includes a pair of continuous main cables 162 that extend essentially straight upward. Each of the main cables 162 has a first fixed end 164 disposed proximate a lower portion 166 of the vertically extending seatback 18 and an upper portion 168 of the main cables 162 is wound about an outer pulley 170 and extends laterally inwardly toward the center of the seating assembly 10. An inner pulley 172 proximate the support plate 84 guides a second movable end 174 of the main cable 162 downwardly to a lateral side of the support plate 84, to which the second movable end 174 of the main cable 162 is fixedly attached. Preferably, a plurality of lateral cables 176 extends between the vertical legs 178 of each of the main cables 162. The plurality of lateral cables 176, preferably three lateral cables 176, is separated by regular vertical intervals proximate the lumbar support region of the seatback 18. The resulting configuration of the main cables 162 and the lateral cables 176 creates a cable lattice structure 180 acting in tension across and within the vertically extending seatback 18.

In the event of a rear impact event, the inertia of the occupant causes the occupant to be displaced rearward toward the vertically extending seatback 18. In so doing, the occupant displaces the cable lattice structure 180 rearward, which increases the tension in the cable lattice structure 180. This creates a second upward force in the support plate 84, exceeding the first force generated by the compression spring 142, in that the second movable end 174 of the main cable 162 fixedly attached to each side of the support plate 84 generates an equal and balanced upward force on each side of the support plate 84, which pulls up on the support plate 84 against the increasing force of the compression spring 142 as the compression spring 142 is further compressed.

As described above, the support plate 84 also raises the inner tube 64 of the active head restraint 30 to interact with the movable head restraint pad 34 via the four bar deployment mechanism 36, described above, to raise the movable head restraint pad 34 to its upward and forward deployed position. After the impact event and after the additional rearward force against the vertically extending seatback 18 and cable lattice structure 180 is removed, the movable head restraint pad 34 returns to its normally stowed position. In an alternative configuration of this embodiment, the outer pulley 170 can be omitted and the vertical leg 178 of the main cables 162 can each extend directly from the first lower fixed end 164 to the inner pulley 172 at an oblique angle, as shown in FIG. 11A.

In a second embodiment of the trigger mechanism, shown in FIG. 13A-13C, a tension spring 182 is vertically disposed about the vertical guide 146. A first upper end 184 of the tension spring 182 is fixedly mounted to an upper portion 32 of the seatback support structure 22, and a second end 186 of the tension spring 182 is fixedly attached to the support plate 84. In its stowed condition, the tension spring 182 is normally extended and urges the support plate 84 upward toward its deployed position. The support plate 84 is preferably restrained from upward motion by a release mechanism 188, such as an electrically actuated solenoid switch, which is operably coupled with and triggered by a rear impact sensor 190 in the event of a rear impact event. This corresponds to the stowed position of the movable head restraint pad 34. Alternatively, the support plate 84 may be restrained from upward motion by a mechanical release 192 that is operably coupled with and triggered by the rear impact sensor 190.

In the event of a rear impact event, the rear impact sensor 190 generates a signal that causes the release mechanism 188 to release the support plate 84. Once being released, the support plate 84 is pulled upwardly by the tension spring 182 to deploy the movable head restraint pad 34, as described above.

In a third embodiment of the trigger mechanism 68, shown in FIGS. 14A-14C, the tension spring 182 is also vertically disposed about a vertical guide 146. A first upper end 184 of the tension spring 182 is likewise fixedly mounted to an upper portion 32 of the seatback support structure 22, and a second end 186 of the tension spring 182 is likewise fixedly attached with the support plate 84. In its stowed condition, the tension spring 182 is again normally extended and urges the support plate 84 upward. The support plate 84 in this embodiment, however, is preferably restrained from upward motion by a mechanical release 192 that is operably coupled with the cable lattice structure 180 acting in tension across and within the vertically extending seatback 18, as described above.

In the event of a rear impact event, the inertia of the occupant again causes the occupant to be displaced rearward toward the vertically extending seatback 18. In so doing, the occupant displaces the cable lattice structure 180 rearward, which increases the tension in the cable lattice structure 180. This force can be used to actuate the mechanical release 192 to release the support plate 84. Once being released, the support plate 84 is pulled upwardly by the tension spring 182 to deploy the movable head restraint pad 34, as described above.

As a consequence of the active head restraint 30 described above, a number of unique benefits are obtained. A first benefit is that upward and forward motion of the movable head restraint pad 34 is provided, which situates the movable head restraint pad 34 in the proper position in the event of a rear impact event. The use of the four bar deployment mechanism 36 provides such upward and forward motion in such a manner so as to result in head H relatively low contact velocity at contact with the head H. This feature also allows the use of an otherwise fixed active head restraint 30, where adjustability is not required by the occupant of the movable head restraint pad 34. By virtue of the side extensions 98, 100 that deploy in conjunction with the movable head restraint pad 34, improved head protection in rear angle impacts is provided.

Also, because the movable head restraint pad 34 is only deployed in the event of a rear impact event, the movable head restraint pad 34 normally remains in the stowed position, which provides for improved rear view with a lower and smaller profile. Additionally, with the movable head restraint pad 34 normally in the stowed position, reduced head interference and increased comfort and clearance are provided.

Another advantage of the active head restraint 30 described above is that no pyrotechnic activation is required. In certain of the embodiments described above, no electronic sensing is required. Likewise, in certain of the embodiments described above, the movable head restraint pad 34 can be readily reset after use.

Further, the manufacture and assembly of the active head restraint 30 is simplified. A simple four bar deployment mechanism 36 is disposed within the active head restraint 30 and can be packaged to provide an aesthetically pleasing design. The active head restraint 30 can be assembled as an assembly and then easily installed in the vertically extending seatback 18, which significantly eases assembly. The trigger mechanism 68 can also be readily integrated into the vertically extending seatback 18, particularly proximate the lumbar support region.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An active head restraint for a seating assembly of a motor vehicle comprising:
   a structural support for a seatback of the seating assembly;
   a movable head restraint pad having a stowed position and a deployed position; a linkage deployment mechanism pivotably attached to the movable head restraint pad, the linkage deployment mechanism comprising an upper bar pivotally attached at a forward end to a rear surface of the movable head restraint pad and pivotally attached at a rearward end to an outer tube fixed to an upper portion of the structural support and a lower bar pivotally attached at a forward end to the rear surface of the movable head restraint pad and pivotally attached at a rearward end to the outer tube;
   an inner linkage disposed within and adapted to reciprocate vertically within the outer tube between a lower stowed position and a raised deployed position;
   a trigger mechanism operatively connected with a lower end of the inner linkage and urging the inner linkage to its raised deployed position in response to a rear impact event; and
   an actuating link having a first end pivotally coupled with an upper end of the inner linkage and a second end pivotally and operatively connected with a mid-length position on the lower bar, wherein upon the rear impact event, the inner linkage is raised from its lower stowed position to its raised deployed position, and the first end of the link is raised upward and applies an upward force to the lower bar to deploy the movable head restraint pad of the active head restraint forward and upward from its stowed position to its deployed position.

2. The active head restraint for a seating assembly of claim 1, wherein the inner linkage is a vertically extending inner tube disposed within and adapted to reciprocate vertically within the outer tube between the lower stowed position and the raised deployed position.

3. The active head restraint for a seating assembly of claim 1, wherein the inner linkage is a rod disposed within and adapted to reciprocate vertically within the outer tube between the lower stowed position and the raised deployed position.

4. The active head restraint for a seating assembly of claim 1, wherein the second end of the actuating link is operatively connected to the lower bar via a pivot pin extending through each of the second end of the actuating link and the mid-length position on the lower bar.

5. The active head restraint for a seating assembly of claim 1, wherein the second end of the actuating link is operatively connected to the lower bar via a roller attached to the second end of the actuating link, the roller disposed in juxtaposed relationship with a lower edge of the lower bar.

6. The active head restraint for a seating assembly of claim 1, wherein the actuating link has an overall length and the second end of the actuating link is pivotally attached to the lower bar proximate a middle of the overall length of the lower bar.

7. The active head restraint for a seating assembly of claim 1, wherein the active head restraint further comprises a pair of rods that extend laterally across the active head restraint, wherein a first rod of the pair of rods is coaxially aligned with a pivot that couples the rearward end of the upper bar to the outer tube and the second rod of the pair of rods is coaxially aligned with the mid-length position on the lower bar and a tension spring extends between and is mounted to each of the pair of rods.

8. The active head restraint for a seating assembly of claim 1, wherein the active head restraint comprises a rear trim panel that encases a surface of the active head restraint mounted to the rear of the pair of outer tubes.

9. The active head restraint for a seating assembly of claim 8, wherein the movable head restraint pad comprises a recess in the rear surface thereof that corresponds with and receives the rear trim panel when the movable head restraint pad is in its stowed position.

10. The active head restraint for a seating assembly of claim 1, wherein the linkage deployment mechanism comprises a four bar deployment mechanism and a pair each of the upper and lower bars, wherein the upper and lower bars of the four bar deployment mechanism are arranged in parallel orientation with the forward end of each of the upper and lower bars extending downwardly relative the outer tube when the movable head restraint pad is in the stowed position and the upper and lower bars are moved to a parallel orientation with the forward end of each of the upper and lower bars extending substantially forward and upward when the movable head restraint pad is in the deployed position.

11. A head restraint comprising a movable pad, a bar pivotally attached at a forward end to the movable pad and at a rearward end to an outer tube, an inner tube disposed within the outer tube, a link coupled with the bar and the inner tube, and a trigger operably connected with the inner tube, wherein, upon a rear impact, the inner tube urges the link to apply an upward force to the bar.

12. The head restraint of claim 11, further comprising side extensions having a first stowed position relative the movable pad and a second deployed position relative the movable pad.

13. The head restraint of claim 12, wherein the side extensions comprise a pair of side extensions each disposed proximate one of a pair of opposite side edges of the movable pad, the active head restraint further comprising a fixed head restraint base, a center roller brace disposed between the fixed head restraint base and the movable pad, a pair of symmetrically spaced roller brace connectors attached at a first end to the fixed head restraint base and at a second end to the center roller brace, wherein a roller is disposed at each end of the center roller brace, a pair of symmetrical side linkages each comprising a first portion fixedly mounted to a respective one of the pair of side extensions, a middle portion pivotably mounted to a respective side edge of the pair of opposite side edges of the movable pad, and a second portion operably connected with a respective roller of the rollers on the ends of the center roller brace,
   wherein as the movable pad moves forwardly and upwardly, the second portion of the side linkages moves forward and thereby moves the center roller brace forward until the brace connectors prevent further forward motion of the center roller brace, the rollers on the ends of the center roller brace then acting against the middle portion of the side linkages to pivot the second portion of the side linkages outward relative the movable pad about the pivot, and to rotate the side rotating forward relative the movable pad, and wherein the side extensions, which are fixedly connected to the first portion of side linkages, are likewise rotated forward relative the movable pad.

14. The head restraint of claim 11, wherein the movable pad further comprises a pair of side-by-side laterally disposed pads, wherein an inner edge of each of the side-by-side laterally disposed pads is arranged in abutting relationship with each other and an outer edge of each of the side-by-side laterally disposed pads extends laterally outwardly when in a stowed position, and wherein when the movable pad is in a deployed position, the outer edges of the side-by-side laterally disposed pads are moved forward relative the inner edges of the side-by-side laterally disposed pads to form a generally concave enclosure.

15. The head restraint of claim 14, further comprising a fixed head restraint base, a center roller brace disposed between the fixed head restraint base and the movable pad, a pair of symmetrically spaced roller brace connectors attached at a first end to the fixed head restraint base and at a second end to the center roller brace, and a pair of side linkages, wherein a first portion of the pair of side linkages is pivotally mounted proximate to and behind the abutting inner edges of the side-by-side laterally disposed pads, a second portion of the side linkages is connected to the outer edges of the side-by-side laterally disposed pads, and a middle portion, such that as the brace connector becomes taut due to forward motion of the movable pad, a pair of rollers on an opposed ends of the center roller brace urge the middle portion of the side linkages outward, urging the second portion of the side linkages to rotate the outer edges of the side-by-side laterally disposed pads forward relative the inner edge of the side-by-side laterally disposed pads to form the generally concave enclosure.

16. An active head restraint for a seating assembly comprising a movable head restraint pad, a linkage deployment mechanism comprising a four bar deployment mechanism having a pair of movable bars, wherein the movable bars are pivotally attached at a forward end to the movable head restraint pad and at a rearward end to an outer tube and the movable bars comprise an upper bar and a lower bar that are arranged in parallel orientation with a forward end of each of the upper and lower bars extending downwardly relative the outer tube when the movable head restraint pad is in the stowed position and the upper and lower bars are moved to a parallel orientation with the forward end of each of the upper and lower bars extending substantially forward and upward when the movable restraint pad is in a deployed position, an inner tube disposed within the outer tube, a link coupled with at least one of the lower bars and the inner tube, and a trigger mechanism coupled with the inner tube, wherein upon a rear impact, the inner tube urges the link to apply an upward force to the at least one lower bar.

17. The active head restraint for a seating assembly of claim 16, wherein the trigger mechanism comprises a support plate disposed within an upper portion of a seatback support structure and attached to a lower end of the inner tube, the support plate comprising a pair of inner tube receiving sockets which engage a lower end of the inner tube, a compression spring vertically disposed about a vertical guide, wherein a first upper end of the compression spring is in abutting relation with and compression against a lower surface of a spring stop forming an upper portion of the vertical guide and a second lower end of the compression spring is in abutting relation with and compressing against an upper surface of the support plate, the compression spring being in a first stowed condition corresponding to the stowed position of the movable head restraint pad urges the support plate downwardly at a first force, and a cable pulley system comprising a pair of continuous main cables each having a first fixed end disposed proximate a lower portion of the seatback support structure, an upper portion wound about a pulley disposed proximate the upper portion of the seatback support structure, and a second movable end extending downwardly to a lateral side of the support plate to which the second movable end of the main cable is fixedly attached to create a cable lattice structure acting in tension across and within the seatback support structure, wherein in the event of a rear impact event, an inertia of an occupant causes the occupant to be displaced rearwardly and displace the cable lattice structure rearwardly to generate a second upward force on the support plate exceeding the first force to pull the support plate and the inner tube upwardly against the compression spring as the compression spring is further compressed to deploy the movable head restraint pad.

18. The active head restraint for a seating assembly of claim 16, wherein the trigger mechanism comprises a support plate disposed within an upper portion of a seatback support structure and attached to a lower end of the inner tube, the support plate comprising a pair of inner tube receiving sockets which engage a lower end of the inner tube, a tension spring having a first upper end fixedly mounted to the upper portion of the seatback support structure and a second end fixedly attached with the support plate, wherein the support plate is restrained from upward motion by a release mechanism.

19. The active head restraint for a seating assembly of claim 18, wherein the release mechanism is an electrically actuated release mechanism or a mechanical release operably coupled with and triggered by a rear impact sensor in the event of the rear impact event.

20. The active head restraint for a seating assembly of claim 18, wherein the release mechanism is a mechanical release operably coupled with and triggered by a cable pulley system comprising a pair of continuous main cables that each have a first fixed end disposed proximate a lower portion of the seatback support structure, an upper portion wound about a pulley disposed proximate the upper portion of the seatback support structure, and a second movable end extending to the mechanical release to create a cable lattice structure acting in tension across and within the seatback support structure, wherein in the event of the rear impact event, an inertia of an occupant causes the occupant to be displaced rearwardly and displace the cable lattice structure rearward to actuate the mechanical release and allow the tension spring to pull the support plate and the inner tube upwardly to deploy the movable head restraint pad.

* * * * *